P. DILLON & J. CLEARY.
Soldering-Machine.
No. 219,569. Patented Sept. 16, 1879.
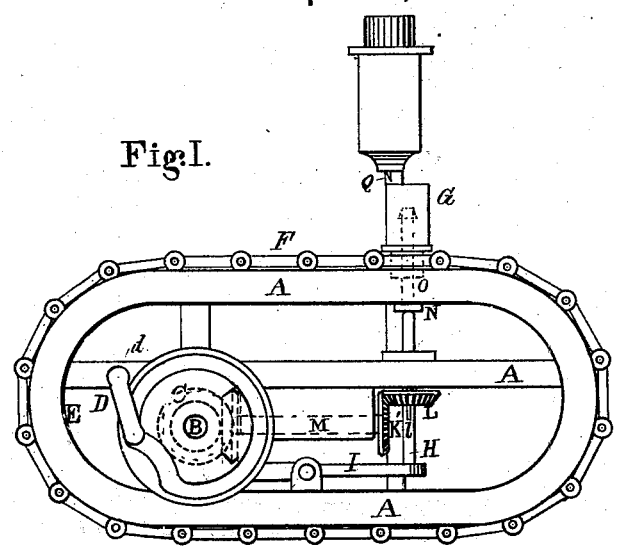
Fig. I.
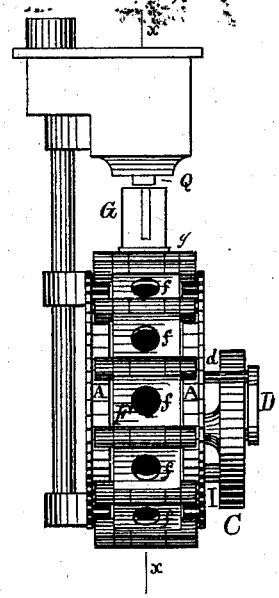
Fig. II.
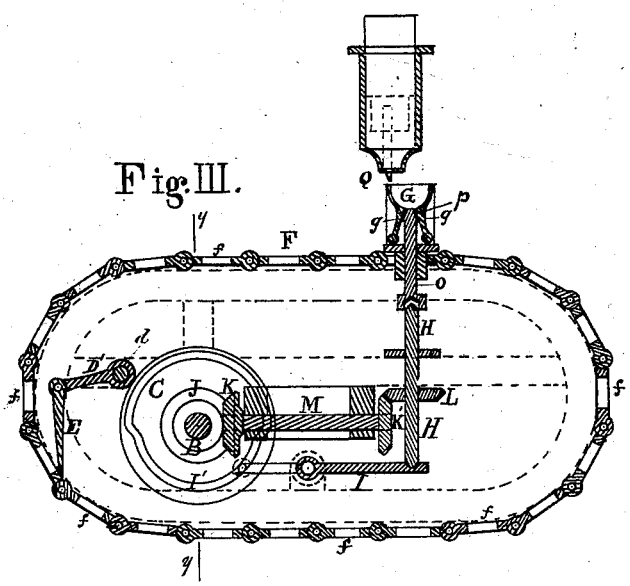
Fig. III.
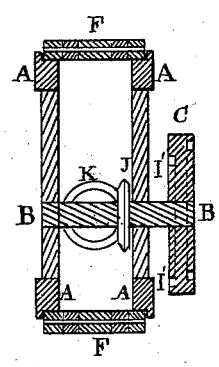
Fig. IV.
Witnesses
R. P. Edwards
J. S. Gray
Inventors
Peter Dillon
John Cleary
Per Wm. R. Singleton
Atty.

UNITED STATES PATENT OFFICE.

PETER DILLON AND JOHN CLEARY, OF SHERBROOKE, QUEBEC, CANADA.

IMPROVEMENT IN SOLDERING-MACHINES.

Specification forming part of Letters Patent No. 219,569, dated September 16, 1879; application filed June 11, 1879.

*To all whom it may concern:*

Be it known that we, PETER DILLON and JOHN CLEARY, of the city of Sherbrooke, in the Province of Quebec and Dominion of Canada, have invented certain Improvements in Soldering-Machines, of which the following is a specification.

This invention relates to improvements in that class of soldering-machines in which solder is supplied to the soldering-tool intermittently, in connection with a carrier formed of an endless chain or series of flat links, which convey to the soldering apparatus the work which is to be soldered, all of which will be hereinafter more fully described.

Figure 1 is a side elevation of the chain carrier and soldering apparatus. Fig. 2 is an end elevation of Fig. 1. Fig. 3 is a longitudinal vertical section on line $x\,x$ of Fig. 2, showing in solid lines the cam-wheel C and beveled gear-wheel J, and the frame A in broken lines. Fig. 4 is a transverse vertical section on line $y\,y$ of Fig. 3.

A is a frame, which supports the traveling chain or carrier. Through two of the uprights passes a main shaft, B, on one end of which is the driving cam-wheel C. This cam-wheel C operates a crank-lever, D. Said lever is on the end of a rock-shaft, $d$, on which is another lever, D, having a pawl, E, which is designed to act upon the endless chain or series of links F F F and cause it to move around on the frame A.

On each link F of the endless chain is placed a spindle or can-holder, G, having interior jaws $g\,g$, to hold the cylinder of the can firmly upon the spindle. Only one spindle is represented; but in Fig. 3, in the section of the links F, the holes $f\,f$, &c., are shown, in which the other spindles are to be fitted, and in Fig. 2 these holes $f\,f$ are shown in the end view. There is also attached to the inside of the driving-wheel C the lever I I, working in a cam-groove, I′, Fig. 3, by which the vertical shaft H is raised and lowered. At the same time that the vertical shaft H is raised and lowered it is made to rotate by means of the beveled gear J, upon the driving-shaft B, (shown in dotted lines in Fig. 1,) working in a corresponding gear, K, which is attached to a shaft, M, on the other end of which is a corresponding gear, K′, which works into a gear, L, on the vertical shaft H. This shaft H passes through the center of the gear L, to which it is attached by a feather, $l$, Fig. 1.

Inserted in the spindle G, and projecting below the frame, is a vertical shaft, O, at the lower end of which is a coupling, N, and at the upper end of which shaft O is a beveled end, $p$.

There is attached to the frame a gas-generator with solder-bath and soldering-bolt Q, arranged in such a manner that the soldering-bolt is immediately above the edge of the spindles as they come to the proper position over the vertical shaft H. Each spindle, as it approaches the soldering apparatus, is supplied with a cylinder to be headed, with the head of tin placed upon the cylinder in position ready to be soldered. As each spindle G, with a cylinder upon it to be headed, is brought upon the endless chain under the soldering apparatus, the vertical shaft H is brought into connection with the shaft O by means of the coupling N, and the shaft O, raising the beveled end $p$, presses outwardly the jaws $g\,g$ of the spindle G in such manner as to tighten and hold the cylinder firmly in position upon the spindle G, while it raises the cylinder and head upward against the point of the soldering-bolt Q, which at the same moment discharges a sufficient quantity of molten solder upon the edge of the head and cylinder, and at the same time the spindle G is made to rotate by means of the gears K, K′, and L, working upon the shaft H. While the cylinder and head are thus raised and rotated against the soldering-bolt Q the latter distributes and smooths the solder upon the seam, and after one or more revolutions of the cylinder the shafts O and H disconnect, and then, by means of the lever D and pawl E operating upon the links F F, the chain passes on, bringing another spindle, G, with another cylinder, into position, when the same operation is repeated.

We claim—

1. In a soldering-machine, the combination of an endless-chain carrier or series of links, each having a spindle to serve as holders for cylinders, with the pawl E, lever D, and cam-wheel C, substantially as described.

2. An endless-chain carrier or series of links, each having a spindle-holder for cylinders worked by the pawl E, lever D, and cam-wheel C, in combination with a soldering apparatus, substantially as described.

3. The spindle G, having internal gripes $g\ g$, shaft O, with its beveled end $p$, in combination with the shaft H, lever I, and cam-wheel C, main shaft B, with the gear-wheels K K' L, and shaft M, whereby the spindle G is caused to rotate under the soldering-bolt Q, substantially as and for the purpose described.

In witness whereof we have signed our names, at the said city of Sherbrooke, this 22d day of April, 1879.

PETER DILLON.
JOHN CLEARY.

Witnesses:
   H. A. ELKINS,
   E. PELLEW FELTON.